(12) United States Patent
Gasser

(10) Patent No.: US 8,894,163 B2
(45) Date of Patent: Nov. 25, 2014

(54) EJECTION DEVICE FOR A DISPLACEABLE FURNITURE COMPONENT

(71) Applicant: Julius Blum GmbH, Hochst (AT)

(72) Inventor: Ingo Gasser, Hochst (AT)

(73) Assignee: Julius Blum GmbH, Hochst (AT)

( * ) Notice: Subject to any disclaimer, the term of this patent is extended or adjusted under 35 U.S.C. 154(b) by 0 days.

(21) Appl. No.: 13/719,811

(22) Filed: Dec. 19, 2012

(65) Prior Publication Data

US 2013/0125681 A1 May 23, 2013

Related U.S. Application Data

(60) Division of application No. 13/218,821, filed on Aug. 26, 2011, now Pat. No. 8,360,537, which is a division of application No. 11/705,416, filed on Feb. 13, 2007, now Pat. No. 8,029,078, which is a continuation of application No. PCT/AT2005/000227, filed on Jun. 24, 2005.

(30) Foreign Application Priority Data

Aug. 16, 2004 (AT) .................................... 1379/2004

(51) Int. Cl.
| | |
|---|---|
| A47B 97/00 | (2006.01) |
| F16H 21/40 | (2006.01) |
| A47B 88/04 | (2006.01) |
| E05F 15/14 | (2006.01) |

(52) U.S. Cl.
CPC ............ *F16H 21/40* (2013.01); *A47B 88/0414* (2013.01); *A47B 88/0477* (2013.01); *E05F 15/147* (2013.01); *E05Y 2201/426* (2013.01); *E05Y 2201/434* (2013.01); *E05Y 2900/20* (2013.01)
USPC ..................................... 312/319.5; 74/421 A

(58) Field of Classification Search
USPC .................. 74/412 R, 413, 416, 421 A, 425; 312/330.1, 319.1, 319.2, 319.5, 294, 312/333, 326, 329; 49/276, 278, 346, 364, 49/366, 367, 379; 361/679.38, 679.43, 361/679.58
See application file for complete search history.

(56) References Cited

U.S. PATENT DOCUMENTS

| | | | |
|---|---|---|---|
| 1,334,712 A | 3/1920 | Olson | |
| 2,223,405 A | 12/1940 | Cain | |

(Continued)

FOREIGN PATENT DOCUMENTS

| | | |
|---|---|---|
| DE | 1778452 | 10/1971 |
| DE | 29 24 145 | 12/1980 |

(Continued)

OTHER PUBLICATIONS

European Search Report issued Feb. 1, 2011 in corresponding European Application No. 10 01 3680.

*Primary Examiner* — James O Hansen
(74) *Attorney, Agent, or Firm* — Wenderoth, Lind & Ponack, L.L.P.

(57) ABSTRACT

An ejection device for a movable furniture component disposed in or against a furniture body includes an electric motor, a lever having a free end for ejecting the movable furniture component, and a gear mechanism for transmitting force from the electric motor to the lever. The gear mechanism has a slipping clutch which includes a spring washer and driving dogs. The spring washer extends upon overload and slips over the driving dogs. The ejection device may also include a path measuring device which activates the ejection device. The path measuring device can be a potentiometer directly coupled to the lever such that slipping of the slipping clutch does not change a position of the potentiometer relative to the lever.

16 Claims, 21 Drawing Sheets

(56) References Cited

U.S. PATENT DOCUMENTS

| | | | |
|---|---|---|---|
| 3,862,788 A | 1/1975 | Hock et al. | |
| 3,894,356 A | 7/1975 | Imhoff | |
| 4,210,277 A | 7/1980 | Kolt | |
| 4,215,884 A | 8/1980 | Little | |
| 4,253,276 A | 3/1981 | Peterson et al. | |
| 4,365,442 A | 12/1982 | Speer | |
| 4,440,035 A * | 4/1984 | Foulk | 74/89.38 |
| 4,635,763 A | 1/1987 | Omata | |
| 4,720,154 A | 1/1988 | Seiter | |
| 5,033,234 A | 7/1991 | Simon et al. | |
| 5,222,407 A * | 6/1993 | Sekiguchi | 74/411 |
| 5,584,207 A * | 12/1996 | Paul et al. | 74/89.22 |
| 5,783,918 A * | 7/1998 | Choi | 318/447 |
| 5,825,616 A | 10/1998 | Howell et al. | |
| 6,241,300 B1 | 6/2001 | Suzuki | |
| 6,510,051 B2 | 1/2003 | Kim | |
| 6,669,250 B1 | 12/2003 | St. Louis | |
| 6,910,749 B2 | 6/2005 | Mueller | |
| 7,373,756 B2 | 5/2008 | Okulov et al. | |
| 2003/0046869 A1 | 3/2003 | Crawford | |
| 2004/0100169 A1 | 5/2004 | Huber et al. | |
| 2006/0061245 A1 | 3/2006 | Huber et al. | |

FOREIGN PATENT DOCUMENTS

| | | |
|---|---|---|
| DE | 203 08 256 | 6/2004 |
| EP | 0 760 309 | 3/1997 |
| EP | 1 314 842 | 5/2003 |
| EP | 1 374 732 | 1/2004 |
| GB | 2 374 521 | 10/2002 |
| JP | 2005-326044 | 11/2005 |
| WO | 2004/100718 | 11/2004 |

* cited by examiner

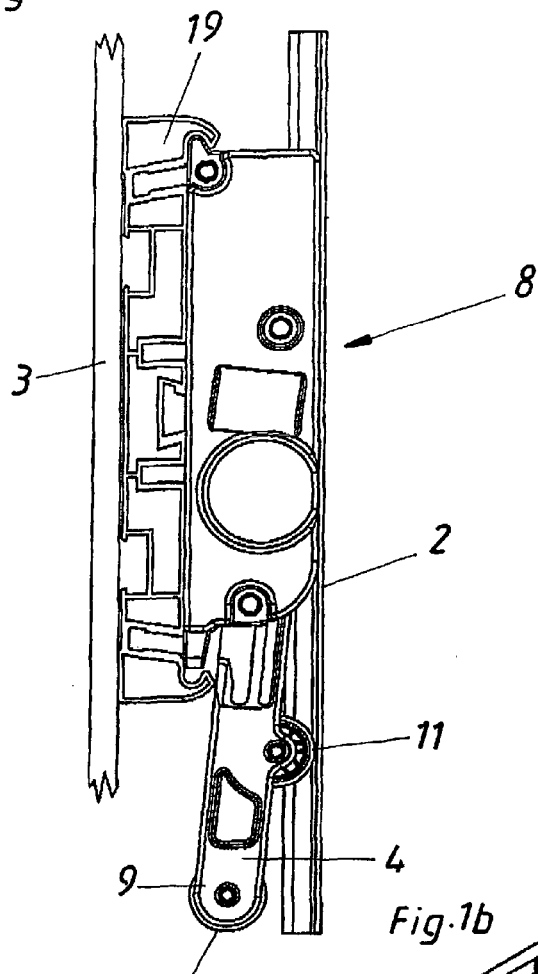
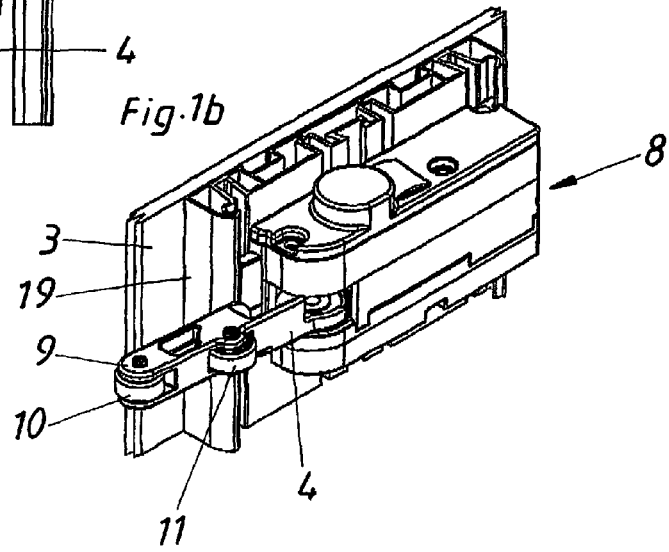

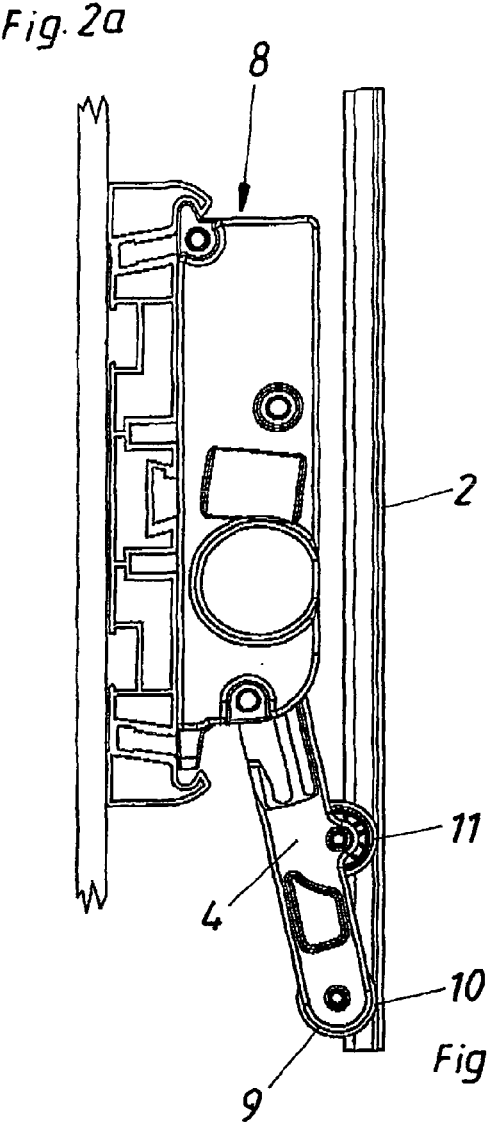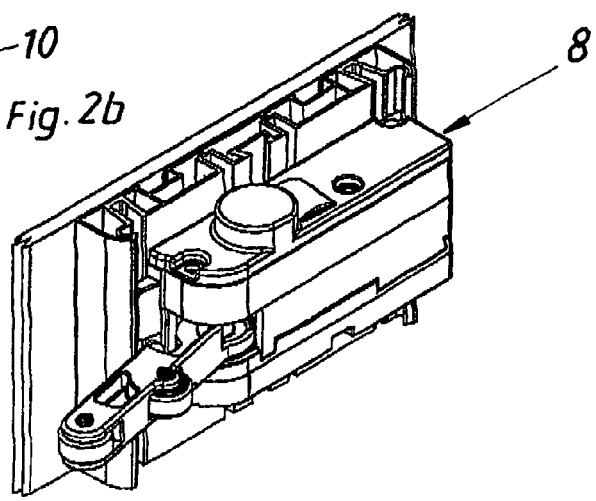

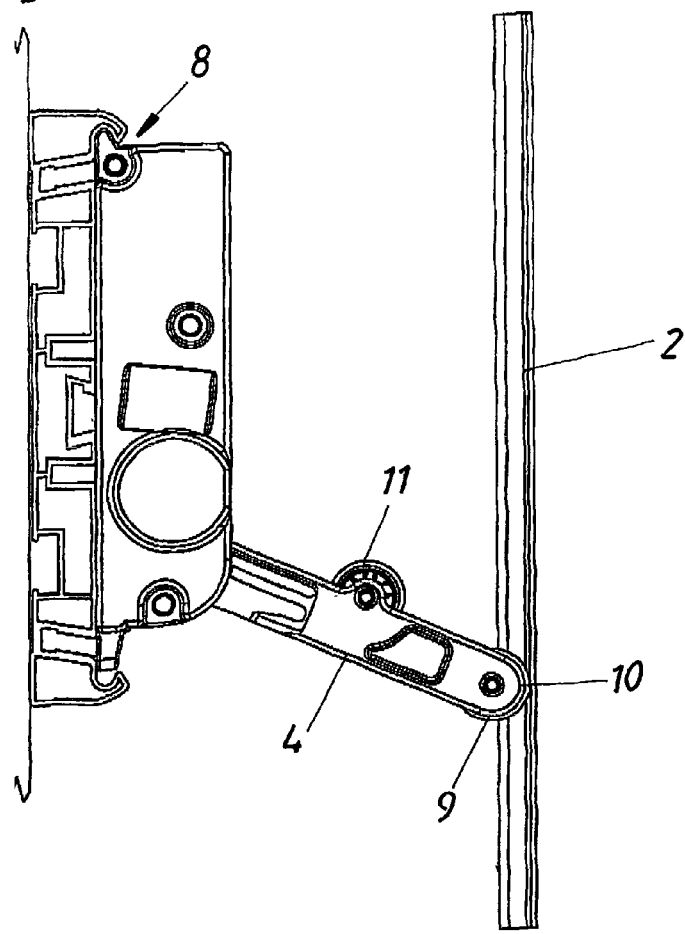
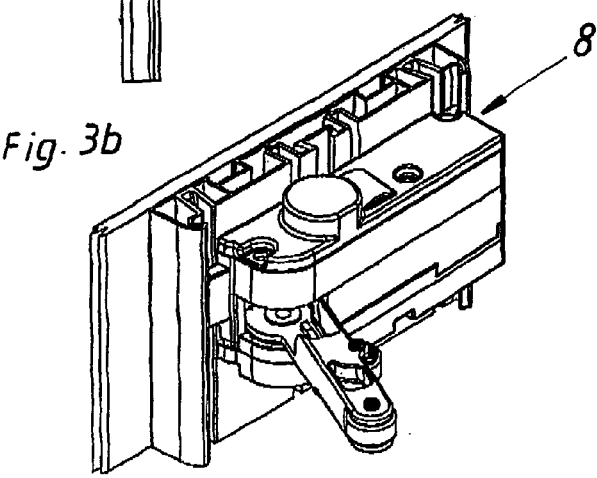
Fig. 3a
Fig. 3b

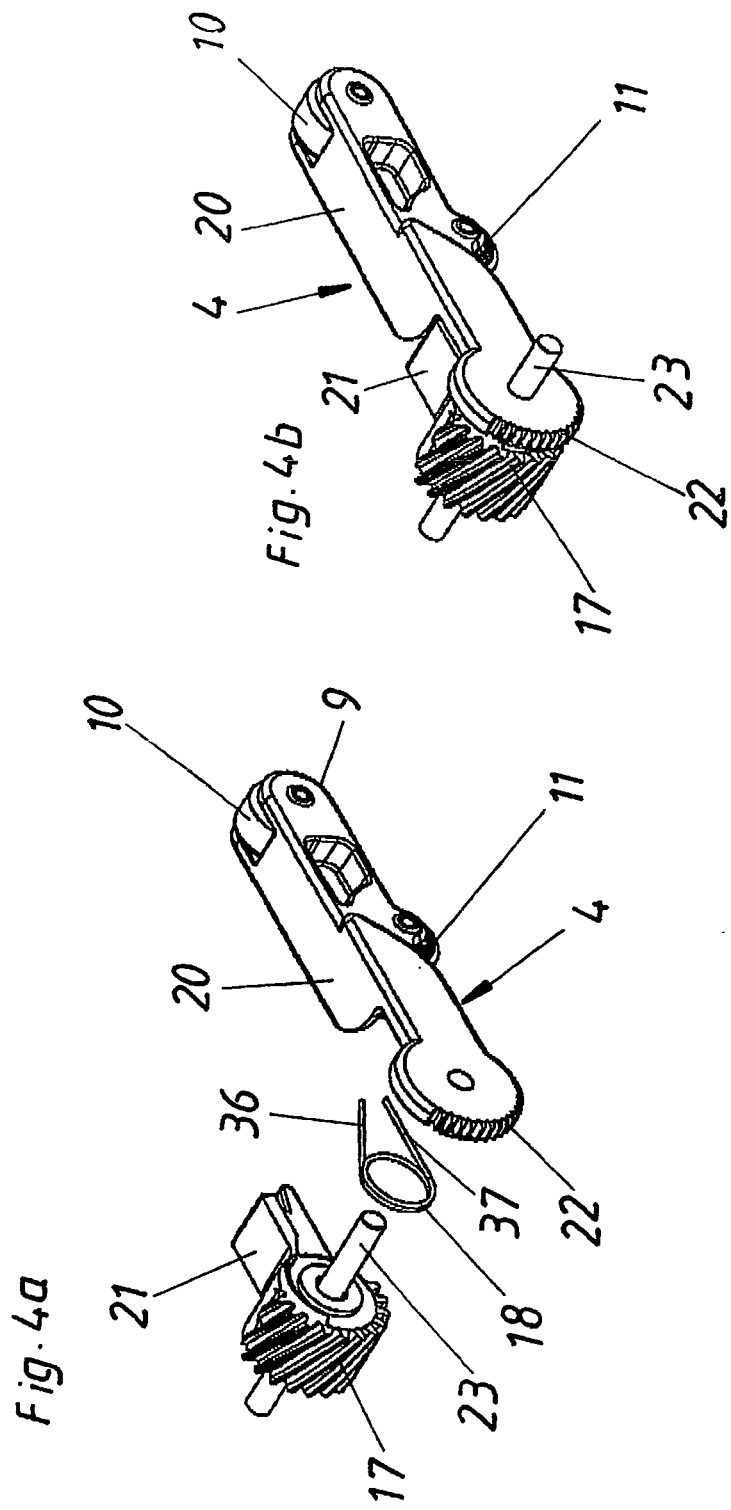

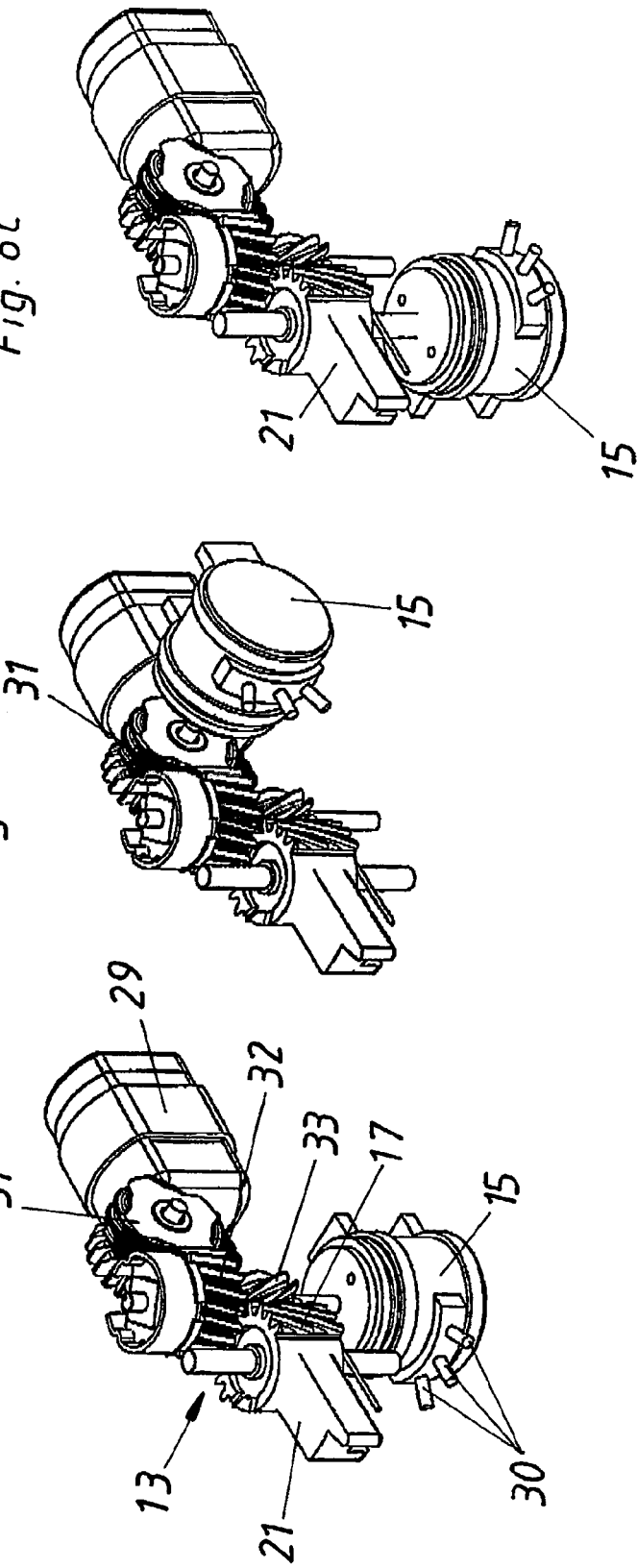

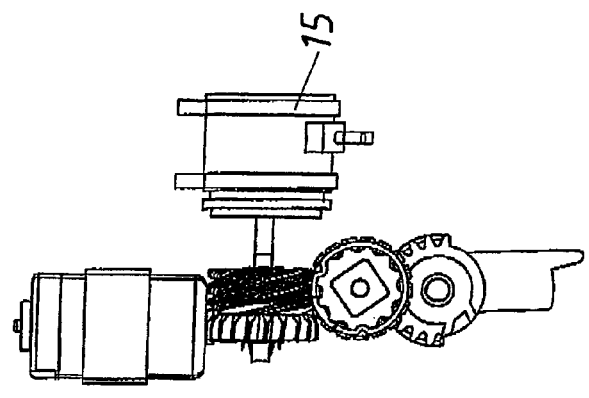
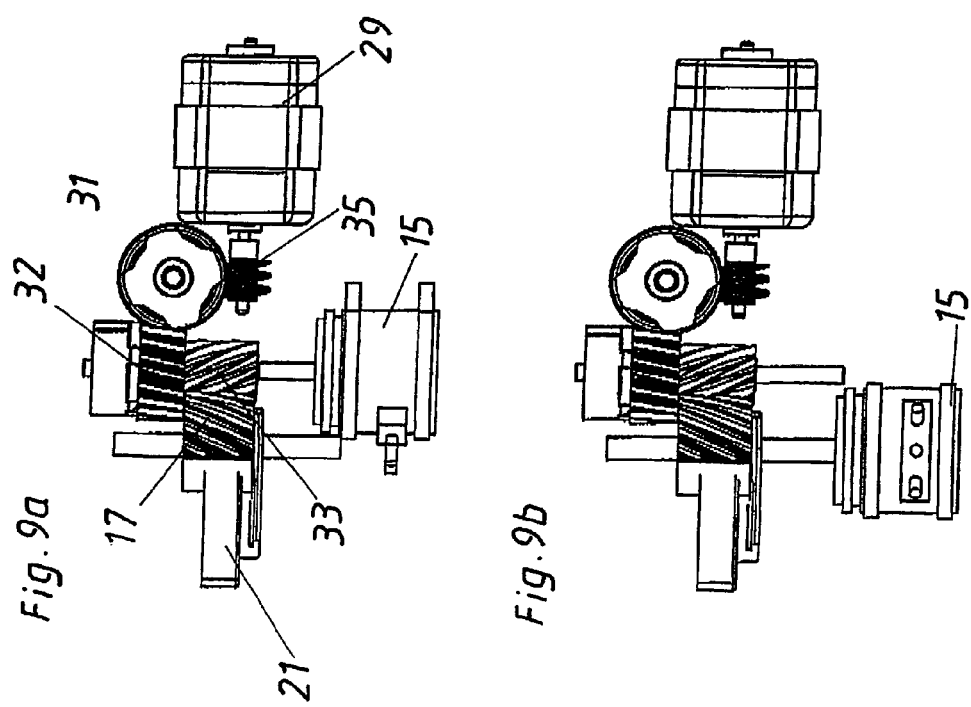

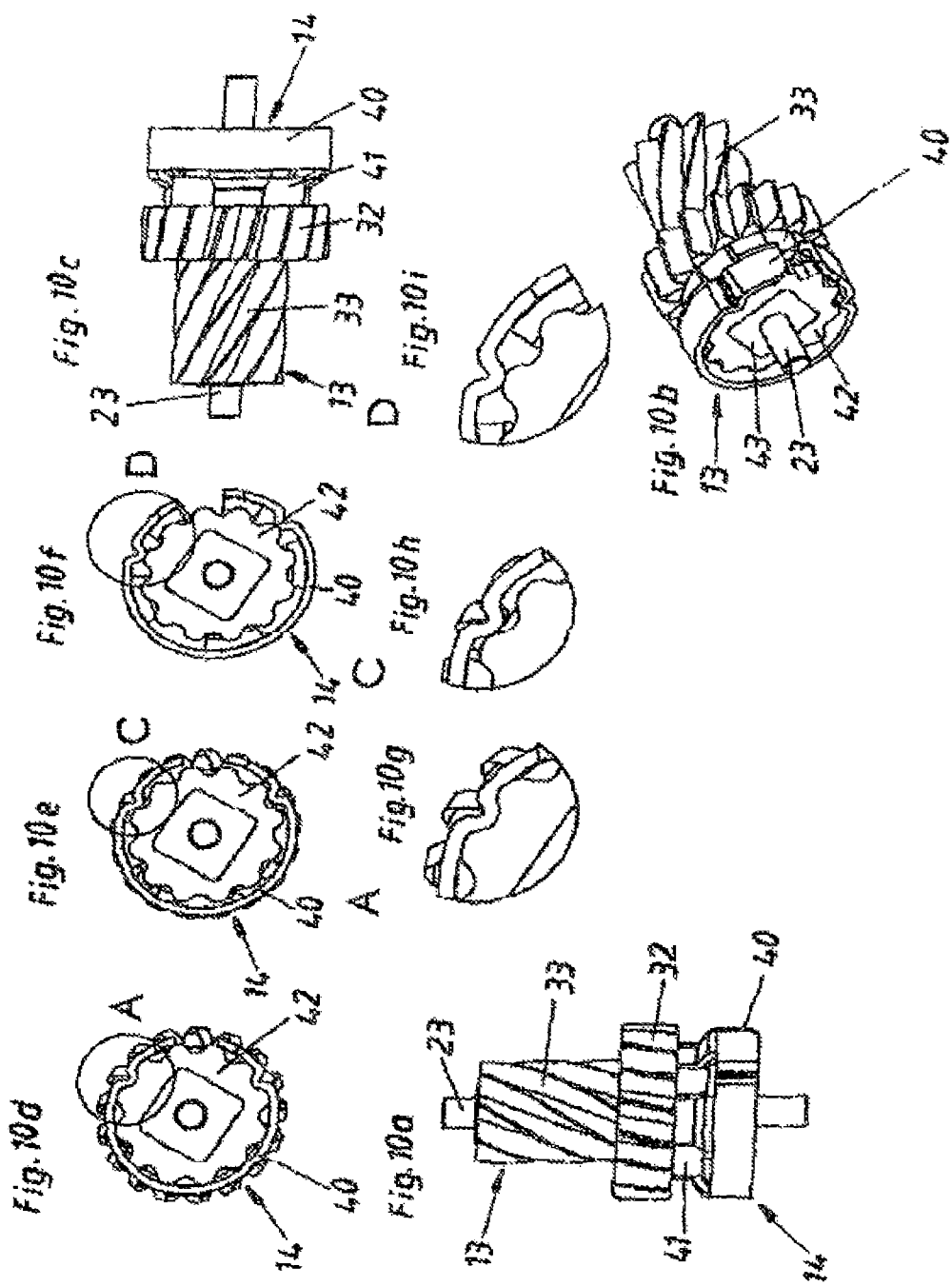

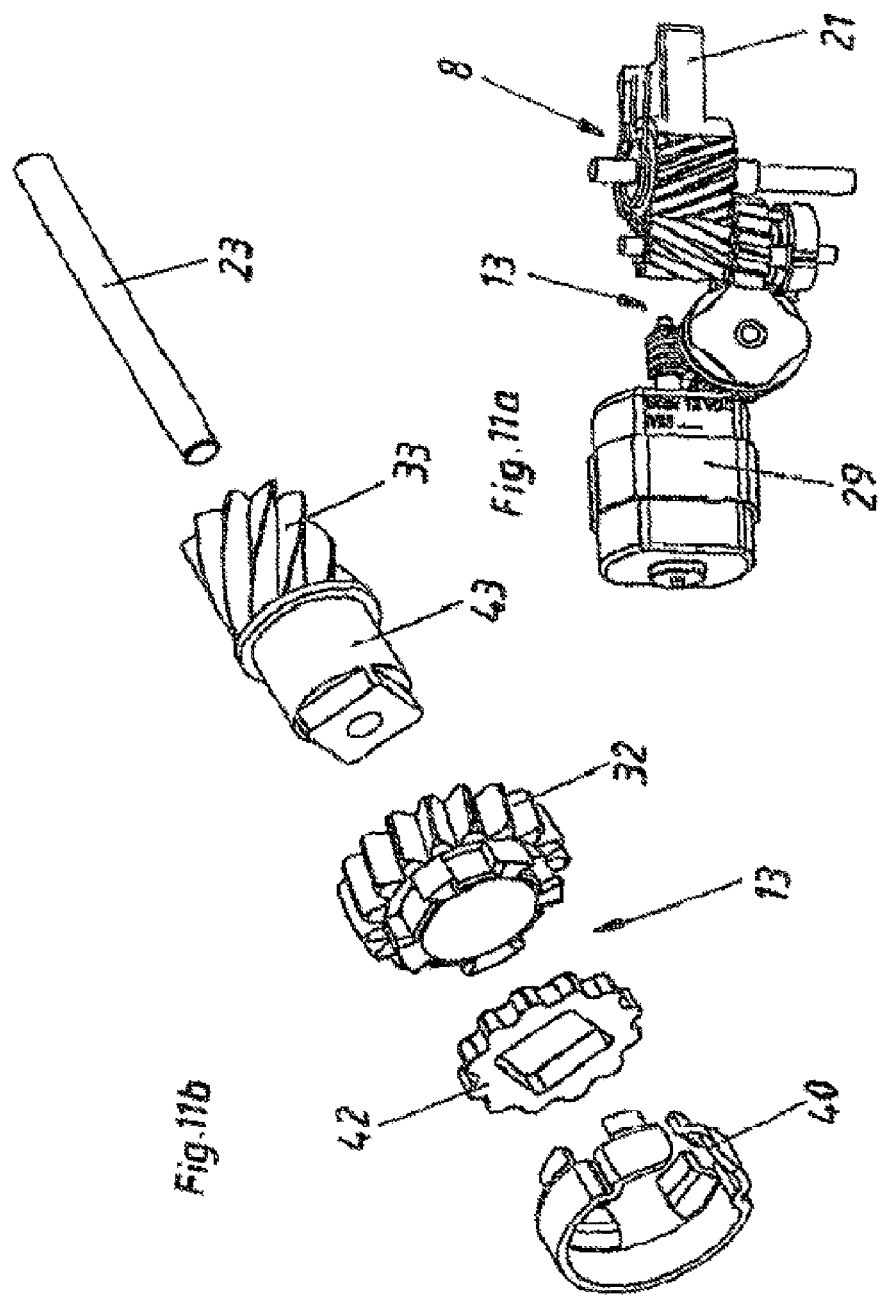

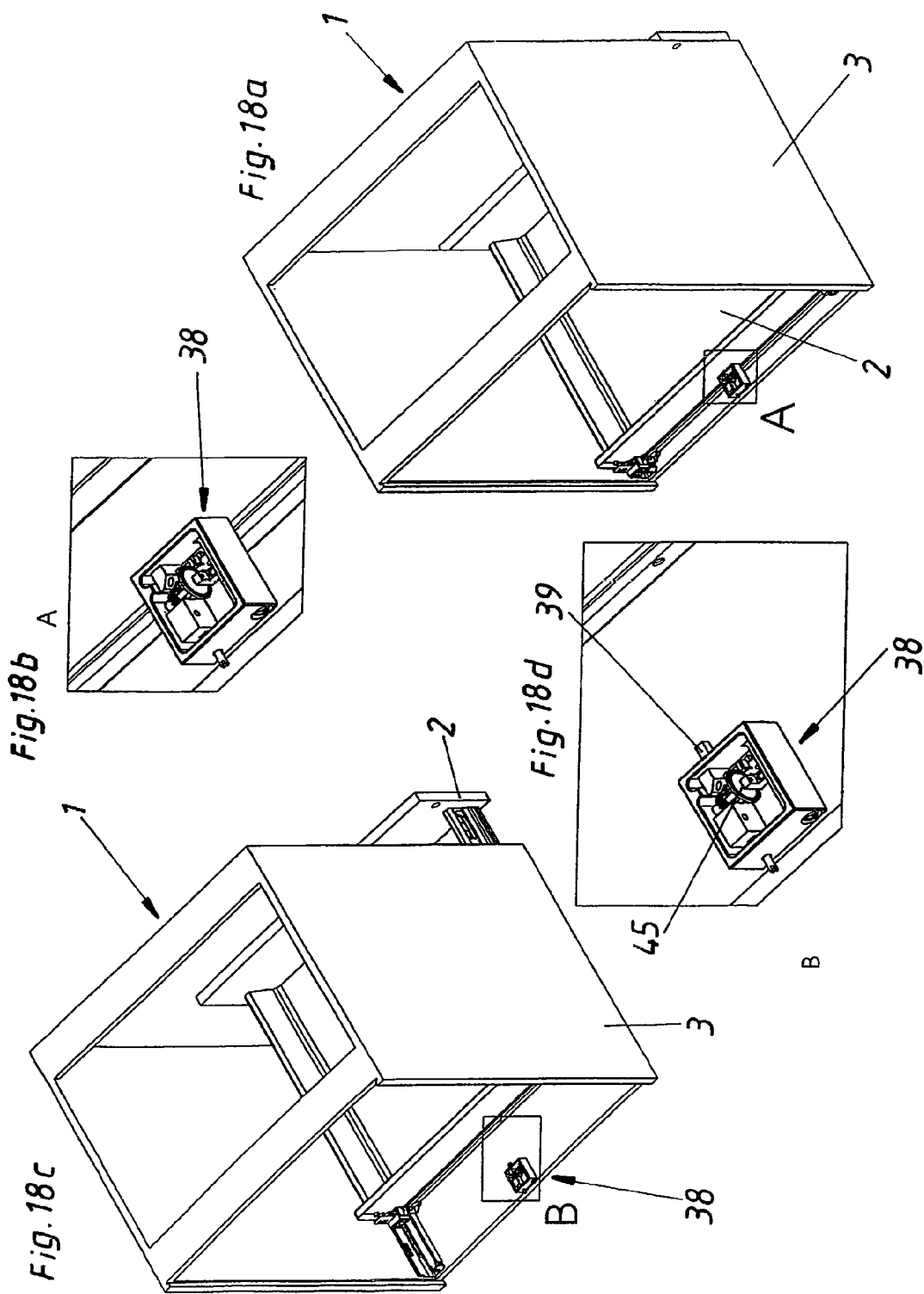

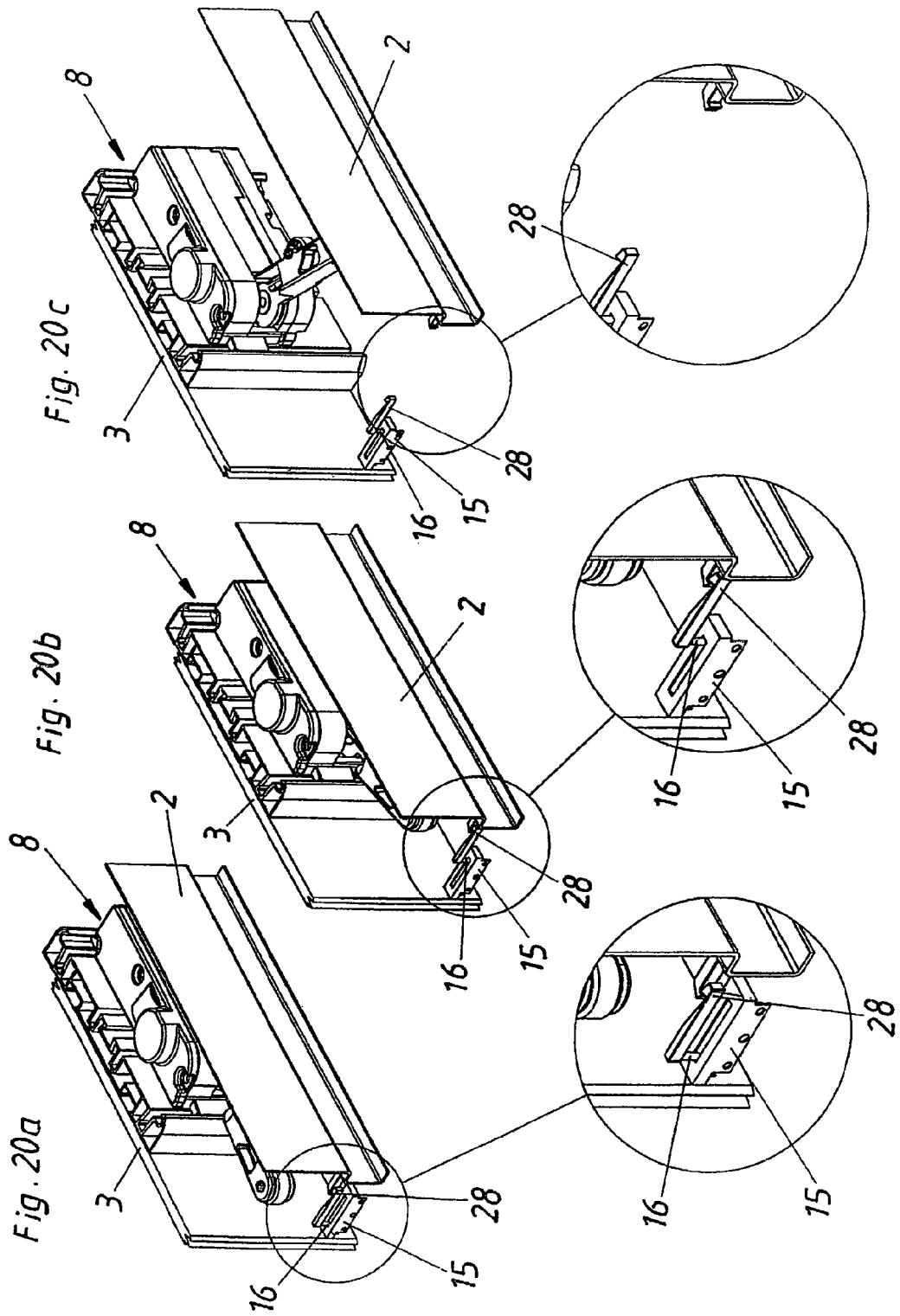

EJECTION DEVICE FOR A DISPLACEABLE FURNITURE COMPONENT

This application is a divisional of U.S. application Ser. No. 13/218,821, filed Aug. 26, 2011, now U.S. Pat. No. 8,360,537, which is a divisional of U.S. application Ser. No. 11/705,416, filed Feb. 13, 2007, now U.S. Pat. No. 8,029,078, which is a continuation of International Application No. PCT/AT2005/000227, filed Jun. 24, 2005, the entireties of which are incorporated herein by reference.

BACKGROUND OF THE INVENTION

1. Field of the Invention

The present invention relates in a first variant to an ejection device for a furniture component moveably housed in or against a furniture body, with a swivellably housed lever, wherein a first castor is attached to the free end of the lever.

2. Description of the Related Art

U.S. Pat. No. 6,669,250 B1 discloses an ejection device for a furniture component (door or drawer) moveably housed in or against a furniture body, with a swivellably housed lever, wherein a castor is attached to the free end of the lever.

EP 1 314 842 A1 discloses an ejection device for a furniture component (door or drawer) moveably housed in or against a furniture body, with a swivellably housed lever, wherein a castor is attached to the free end of the lever.

EP 1 374 732 A1 discloses an ejection device for a furniture component (drawer) moveably housed in or against a furniture body, with an electric drive unit, a control or regulation apparatus to control or regulate the drive unit, and a gear mechanism to transmit power from the drive unit to an ejector.

DE 29 24 145 A1 discloses an ejection device for an oven carriage moveably housed in a domestic oven, with a swivellably housed lever (transport lever) and an electric drive unit (electric motor).

U.S. Pat. No. 4,720,154 A discloses an example embodiment of an ejection device for a drawer moveably housed in a furniture body (cash dispenser), with a swivellably housed lever and an electric drive unit (electric motor) (See FIG. 10).

WO 2004/100718 A1 discloses an ejection device for a furniture component (door or drawer) moveably housed in or against a furniture body, with a swivellably housed lever, an electric drive unit, and a control or regulation apparatus to control or regulate the drive unit.

The problem with the above-described ejection devices is that in most cases the initial acceleration of the movable furniture component to which the force of the lever has been applied is extremely sluggish. In order to counter this problem, the drive unit provided for the lever is frequently over-dimensioned in order to have the capacity to achieve a rapid initial acceleration of the movable furniture component via the lever. After the initial acceleration of the movable furniture component, a much smaller drive capacity would be sufficient.

SUMMARY OF THE INVENTION

The object of the invention is to create an ejection device which does not have the above-described problem.

This is achieved by a second castor which is attached to the lever at a distance from the free end of the lever.

Uniform loading of the drive unit for driving the lever over the entire ejection distance is achieved by this feature of the invention. The swivellably housed lever first comes into contact with the movable furniture component via the second castor attached to the lever at a distance from the free end of the lever, whereby the torque exerted on the movable furniture component is less than the torque exerted when the castor attached to the free end of the lever first contacts the furniture component. The drive unit, which may comprise an electric motor, is thereby subjected to a smaller torque during the initial acceleration of the movable furniture component. The result of this is a more favorable starting behavior, which is perceived by the user as more responsive initial acceleration of the movable furniture component.

After the initial acceleration of the movable furniture component, the lever comes into contact with the movable furniture component via the first castor attached to the free end of the lever and can thus exert a greater force on the movable furniture component via the greater torque (due to the longer lever arm). As the inertia of the movable furniture component has been overcome, the drive unit is now, in spite of the greater torque, loaded to approximately the same extent as during the initial acceleration phase. Therefore, the overall result is an equal distribution of the load of the drive unit over the entire ejection distance of the movable furniture component.

In a particularly preferred embodiment of the invention, the second castor is attached to the lever at approximately half way between the free end and the other end of the lever. The result is a satisfactory distribution of the load forces acting on the drive unit.

A further, second variant of the invention is an ejection device for a furniture component moveably housed in or against a furniture body, with a swivellably housed lever and a drive unit, in particular electric, to drive the lever.

Typically, the operation of such ejection devices generates unpleasant noise. In addition to the initial sound of the impact when the swivellably housed lever comes into contact with the movable furniture component, further operation of the ejection device also generates unpleasant noise.

The object of this variant of the invention is to create a generic ejection device which is characterized by the generation of less noise.

This is achieved by a lever having at least a first lever part and a second lever part, wherein the first lever part can be brought into contact with the movable furniture component and the second lever part can be driven by the drive unit. The first lever part is coupled, movable to a limited extent, to the second lever part, and an energy accumulator acts between the first lever part and the second lever part such that the first lever part is pre-loaded relative to the second lever part.

The two-part design of the lever results in interaction between the first and the second lever part. By pre-loading the first lever part relative to the second lever part, the first lever part is pressed against the movable furniture component. The second lever part is forced away from the first lever part by the force of the energy accumulator. As a result, the parts of the drive unit in contact with the second lever part are also subjected to stress. Surprisingly, this leads to a reduction of the operating noise of the ejection device.

In an advantageous embodiment of this variant of the invention, the first lever part is pre-loaded relative to the second lever part by a spring. This represents a particularly simple structural realization of this variant of the invention.

A further, third variant of the invention is an ejection device for a furniture component moveably housed in or against a furniture body, with a swivellably housed lever to eject the movable furniture component, a drive unit, in particular electric, to drive the lever, and a control or regulation apparatus to control or regulate the drive unit.

With such ejection devices the problem arises of how the user can best actuate the ejector. In this regard, it is advantageous if the ejection device can be operated as intuitively as possible.

The object of this variant is, therefore, to create an ejection device which can be actuated intuitively.

This is achieved by a switch for the actuation of the ejection device. The switch is attached to, or in the lever, such that the signals from the switch can be fed at least to the control or regulation apparatus.

This feature of the invention permits the ejection device to be actuated by pressing the front panel of the movable furniture component into the furniture body. For this, sufficient interaction must of course remain when the movable furniture component is in closed position. As soon as the movable furniture component comes into contact with the switch attached to the lever, the switch sends the actuation signal to the control or regulation apparatus of the ejection device.

A particular advantage results when this variant is combined with the second variant of the invention. If the lever has at least a first and a second lever part, the switch can have at least two contacts, wherein the first contact is attached to the first lever part and the second contact is attached to the second lever part.

By pressing the movable furniture component into the furniture body, the first lever part resting against the movable furniture component is pushed in the direction of the second lever part, whereby the two contacts touch and close the circuit.

An energy accumulator is preferably arranged between the two lever parts to generate an initial stress.

Alternatively, the switch may comprise a push switch which is preferably attached to the free end of the lever. A two-part design of the lever can be dispensed with in this embodiment.

A further, fourth variant of the invention is an ejection device for a furniture component moveably housed in or against a furniture body, with an ejector to eject the movable furniture component, a drive unit, electric in particular, a gear mechanism to transmit power from the drive unit to the ejector, and a control or regulation apparatus to control or regulate the drive unit.

In such ejection devices it is frequently desirable to know the position of the ejector, in order to, for example, be able to configure the ejection profile according to the position. Accordingly, actuation of the ejection device can occur during an initial displacement caused by a user of the movable furniture component and the ejector.

It is therefore the object of this variant of the invention to create an ejection device in which the position of the ejector can be established.

This is achieved by providing the ejection device with a potentiometer, wherein the signals from the potentiometer can be fed at least to the control or regulation apparatus, and the actuator of the potentiometer is coupled to the gear mechanism.

Compared with other path-measuring devices, all potentiometers have the advantage that they measure the position of the ejector in absolute terms, hence there is no need to initialize the path-measuring device.

If the ejector comprises a lever, it is particularly advantageous if the drive of the gear mechanism is formed in one piece with the lever.

In this case, the actuator of the potentiometer can be directly coupled with the lever. This has among other things the advantage that, if the gear mechanism comprises a slipping clutch, the position of the lever can be correctly determined in spite of the lever slipping through.

In particular, in the case of a swivellably housed lever, in order to avoid a change of movement, it is particularly advantageous if the potentiometer is a rotary potentiometer.

A further, fifth variant of the invention is an ejection device for a furniture component moveably housed in or against a furniture body, with an ejector to eject the movable furniture component, an electric drive unit, and a gear mechanism to transmit power from the drive unit to the ejector.

Such ejection devices are problematic because the gear mechanism is frequently damaged as a result of misuse of the ejection device. For example, a user wishing to close an ejected movable furniture component often pushes the movable furniture component with considerable force, in the direction of the furniture body. If the movable furniture component strikes the ejector of the ejection device, this force is transmitted to the gear mechanism of the ejection device, which can lead to destruction of the gear mechanism in the worst case.

The object of the invention is therefore to create an ejection device which does not have the above-described problem.

This is achieved by providing the gear mechanism with a slipping clutch.

If the force transmitted by the ejector onto the gear mechanism exceeds a limit value governed by the structure of the slipping clutch, the gear mechanism coupled to the slipping clutch will slip through, which prevents damage to the gear mechanism.

The present invention also relates to an item of furniture with a movable furniture component, in particular drawer or door, with an ejection device according to one of the previously mentioned variants of the invention.

A path-measuring device can be attached to or in the item of furniture to actuate the ejection device.

In order to allow the simplest possible incorporation into an item of furniture according to the invention, it is particularly advantageous if the path-measuring device is attached to or in the ejection device.

However, the path-measuring device can also be attached to or in the furniture body.

A possible embodiment of the invention which is characterized by its simplicity includes a path-measuring device comprising a pusher to which pressure can be applied by the movable furniture component.

If the ejection device is to be actuated by a pulling force applied to the movable furniture component by the user, it can be advantageous to provide the path-measuring device with a drive carrier which can be coupled with the movable furniture component.

The path-measuring device can be formed both as an absolute measuring device and as an incremental measuring device.

In the first case, the path-measuring device can, for example, comprise a potentiometer. In the second case, the path-measuring device can, for example, comprise an encoder.

BRIEF DESCRIPTION OF THE DRAWINGS

Further features and advantages of the invention will be seen from the following description and the accompanying figures, in which:

FIGS. 1a to 1b, 2a to 2b and 3a to 3b to 3 show a first embodiment of the invention in top view and in perspective view, for different positions of the lever of the ejection device;

FIGS. 4a to 4b and 5a to 5d show a second embodiment of the invention, in various views;

FIGS. 8a to 8c and 9a to 9c show a fourth embodiment of the invention, in different views;

FIGS. 10a to 10i and to 11a to 11b show a fifth embodiment of the invention, in different views;

FIGS. 18a to 18d show an embodiment of an item of furniture according to the invention;

FIGS. 20a to 20c are perspective views of a further embodiment of an ejection device according to the invention.

DETAILED DESCRIPTION OF THE INVENTION

Figure 5A:
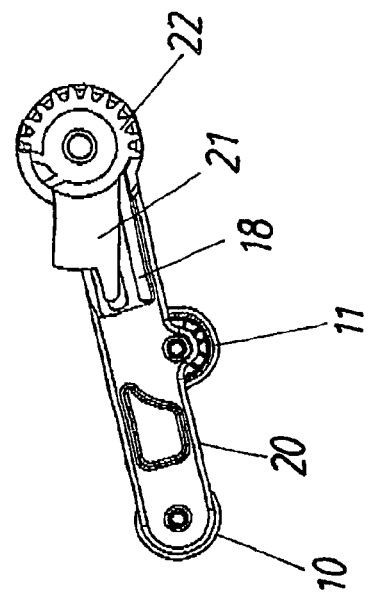
Figure 5B:
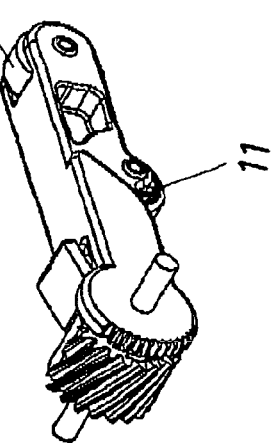

FIG. 1a is a top view of a first embodiment of an ejection device 8 according to the invention which is attached to a furniture body 3 via a bearing rail 19. The ejection device 8 has a swivellably housed lever 4, wherein a first castor 10 is attached to the free end of the lever 9 ("free lever end"), and a second castor 11 (i.e. roller) is attached approximately half-way between the articulation point of the lever 4 and the free lever end 9. In the position represented in FIG. 1a, the movable furniture component 2, of which only the rear panel is represented here, is in its closed position in the furniture body 3, as a result of which the lever 4 lies with the second castor 11 against the movable furniture component 2.

FIG. 1b shows a perspective view of the ejection device 8, whereinto the movable furniture component 2 has not been illustrated for greater clarity.

In FIG. 2a, the movable furniture component has already been moved by the lever 4 so far from its closed position in the furniture body 3 that now the first castor 10 attached to the free lever end 9 also comes into contact with the movable furniture component 2.

FIG. 2b is a perspective view of the ejection device 8 in this position.

FIGS. 3a and 3b show the situation shortly before the movable furniture component 2 moves completely away from the lever 4. Lever 4 is now in contact with the movable furniture component 2 via the first castor 10 attached to the free lever end 9, while the second castor 11 is no longer in contact with the movable furniture component 2.

FIGS. 4a and 4b show a lever 4 according to the invention which consists of a first lever part 20 and a second lever part 21. The second lever part 21 is formed in one piece with the drive 17 of a gear mechanism 13, not illustrated in FIG. 4. A first castor 10 for applying a load on a movable furniture component 2, not illustrated in FIG. 4, is provided at the free lever end 9 against the first lever part 20. Furthermore, the second castor 11 is arranged approximately in the middle of the lever 4. Arranged between the first lever part 20 and the second lever part 21 is a spring 18 which rests with one end 36 against the second lever part 21 and with its other end 37 against the first lever part 20. The first lever part 20 is thereby pre-loaded in relation to the second lever part 21. In this example embodiment, a drive wheel 22 is formed against the first lever part 20 for a potentiometer 15, not illustrated in FIG. 4, for determining the position of the lever 4.

Figure 5C:
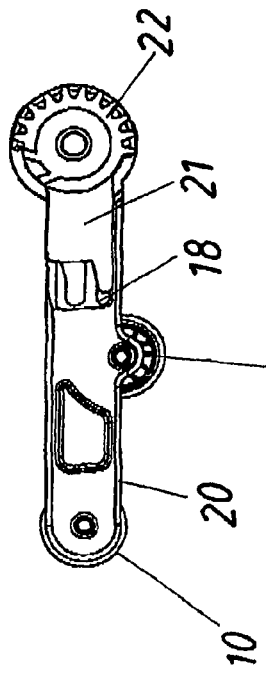
Figure 5D:
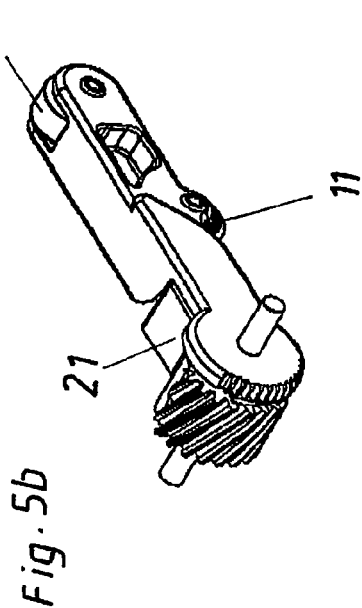
Figure 6B:
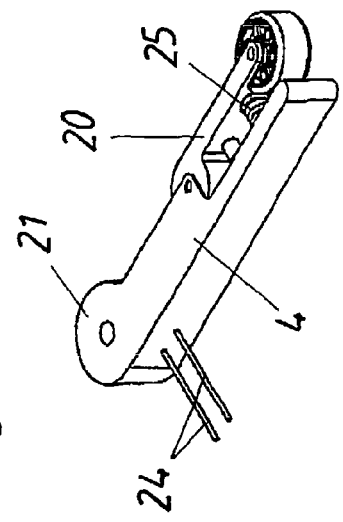
FIGS. 6a to 6d show a third embodiment the invention, in various views.
Figure 6D:
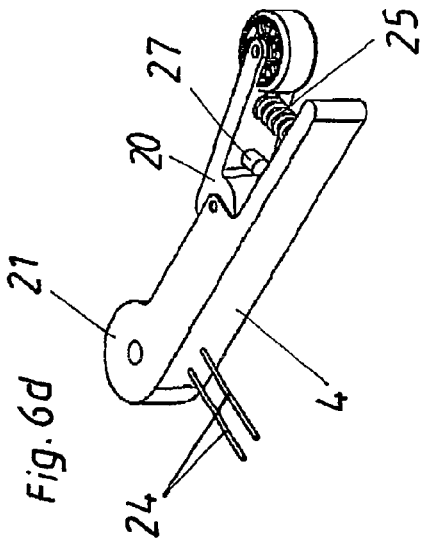
Figure 6A:
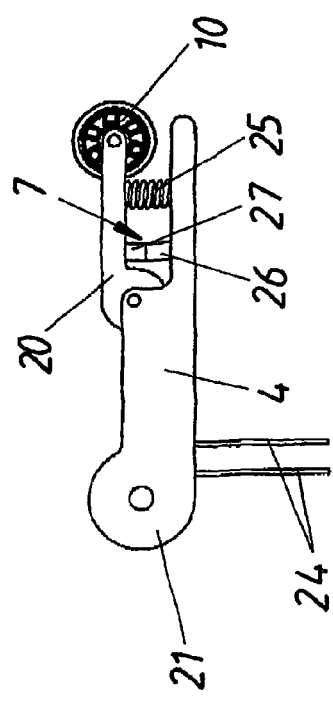
Figure 6C:
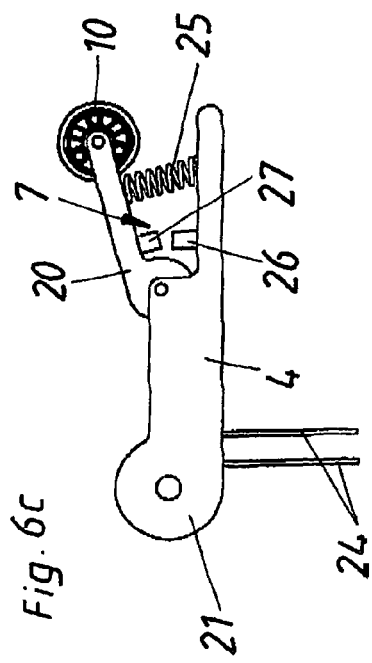
Figure 7A:
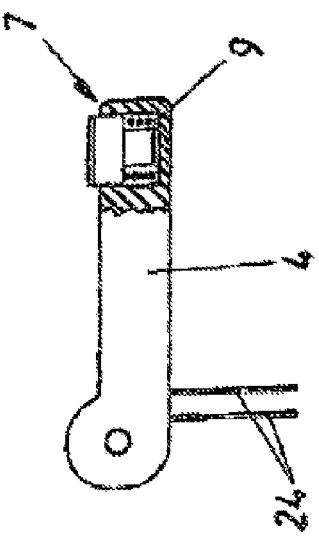
FIGS. 7a to 7d show a further variant of the third embodiment of the invention.
Figure 7B:
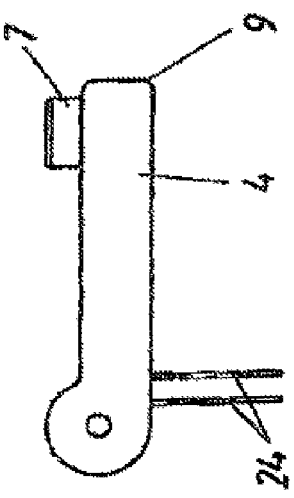
Figure 7C:
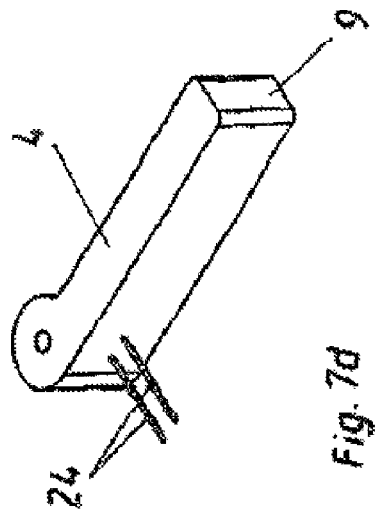
Figure 7D:
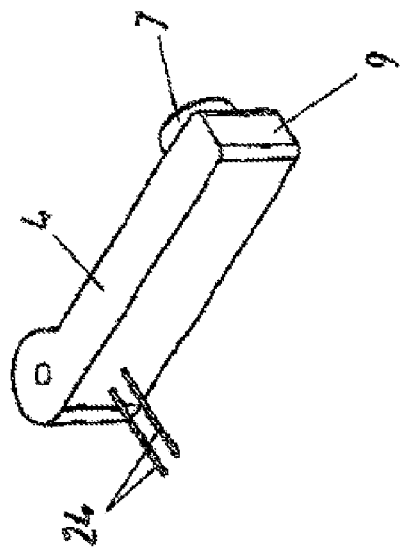

FIG. 5c shows the respective positions of the first lever part 20 and the second lever part 21 when the movable furniture component 2, not illustrated in FIG. 5, is in its closed position. The castor 10 lies against the rear panel of the movable furniture component 2. In FIG. 5a, the second lever part 21 is driven via the drive 22 of a gear mechanism 13 not illustrated in FIG. 5 in order to eject the movable furniture component 2. The first lever part 20 thereby lies against the second lever part 21. The spring 18 supports the ejection process of the movable furniture component 2. FIGS. 5b and 5d are perspective views of FIGS. 5a and 5c.

FIGS. 6a to 6d show a first embodiment of the third variant of the invention which includes a switch 7 attached to the lever 4. As in the aforementioned embodiment, the lever 4 has a first lever part 20 for the application of force to a movable furniture component 2 not illustrated in FIG. 6, and a second lever part 21 which is connected to a drive unit 5, likewise not represented. A spring 25 is arranged between the two lever parts 20, 21. A castor 10 is attached to the first lever part 20. The switch 7 comprises a first contact 27 attached to the first lever part 20 and a second contact 26 attached to the second lever part 21. In the positions illustrated in FIGS. 6c and 6d, the two contacts 26, 27 are separated. This corresponds to the inactive position of the switch 7. A user, not illustrated, moves the furniture component 2, also not illustrated, in the direction of closure, i.e. into the furniture body 3, also not illustrated. The first lever part 20 is thereby moved against the application of force of the spring 25. The two contacts 26, 27 thereby come into contact, which completes an electrical circuit, which is not illustrated in detail, for clarity, whereby an actuation signal is relayed to the drive unit 5 over the lines 24.

FIGS. 7a to 7d show a second embodiment of the third variant of the invention, in which the lever 4 is formed in one piece. In this embodiment, the switch 7 is formed as a push switch attached to the free lever end 9.

FIGS. 8a to 8c show different embodiments of the fourth variant of the invention. A gear mechanism 13 which serves to transmit power from the electric motor 29 to the second lever part 21 is shown. Power is transmitted, via a spindle 35, which cannot be seen in FIG. 8 (but can be seen in FIGS. 9a and 9b), the toothed wheel 31, the further toothed wheel 33, and the drive 17 of the gear mechanism, which in this embodiment is formed in one piece with the second lever part 21. According to the invention, in each of FIGS. 8a to 8c, a potentiometer 15 (here, a rotary potentiometer) is connected to the gear mechanism 13. The potentiometer 15 has three contacts 30 for connecting or tapping electrical current. In the embodiment shown in FIG. 8a, the potentiometer 15 is connected to the middle stage of the gear mechanism 13 via a common axle. In the embodiment shown in FIG. 8b, the potentiometer 15 is connected to the toothed wheel 31. In the particularly preferred embodiment of FIG. 8c, the potentiometer 15 is connected to the second lever part 21.

FIGS. 9a to 9c show alternative views of the embodiments illustrated in FIGS. 8a to 8c.

FIGS. 10a to 10f show an embodiment of the fifth variant of the invention. FIG. 10a is a side view of a part of a gear mechanism 13 which comprises a slipping clutch 14. In this embodiment, the slipping clutch 14 consists of a spring washer 41 which broadens when disproportionately loaded and slides over the driving dogs 42. This process is illustrated in FIGS. 10d to 10f. FIGS. 10g to 10i show this process in detail. FIG. 10b is a perspective view of part of gear mechanism 13.

The structure of the of the gear mechanism 13 shown in FIGS. 10a to 10i can be seen more clearly in the exploded view of FIG. 11b. The toothed wheel 33, the further toothed wheel 32, which is connected in rotation-resistant manner to the spring washer 40, and the driving dogs 42 are arranged on a common pin 23. The driving dogs 42 are fitted conjugately onto the part of the toothed wheel 33 formed as a bolt 43. FIG. 11a is a perspective view of the complete gear mechanism 13, which is driven by an electric motor 29 and in turn drives the second lever part 21.

Figure 12:
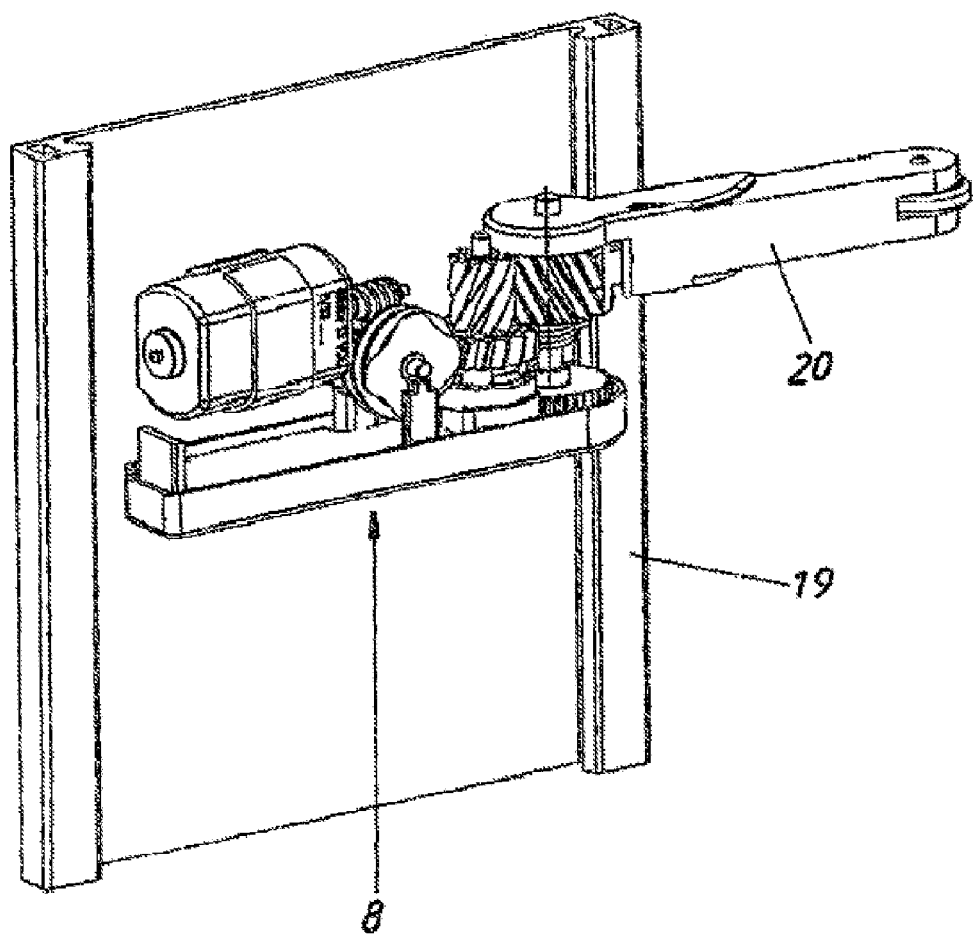
FIG. 12 is a perspective view of a further embodiment of an ejection device according to the invention.

FIG. 12 shows the ejection device 8 illustrated in FIGS. 11a-11b attached to a bearing rail 19. The first lever part 20 and a portion of the casing are shown.

Figure 13:
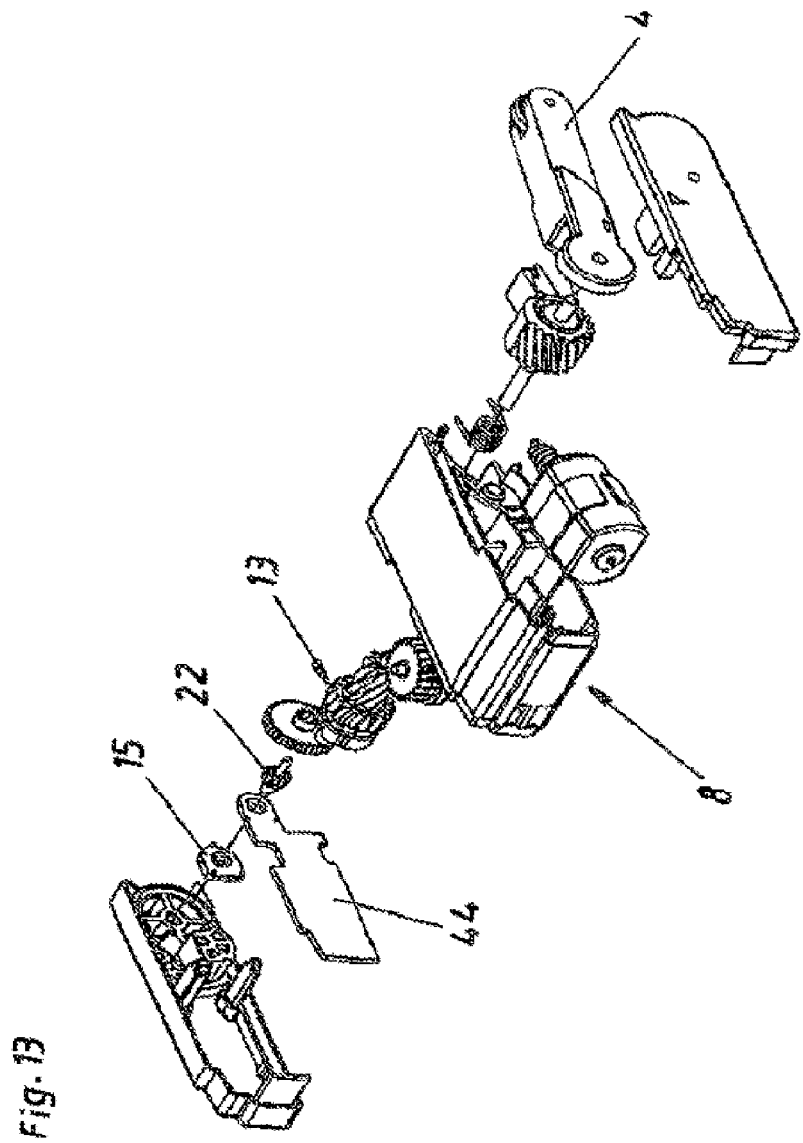
FIG. 13 is an exploded view of the ejection device shown in FIG. 12.
Figure 14:
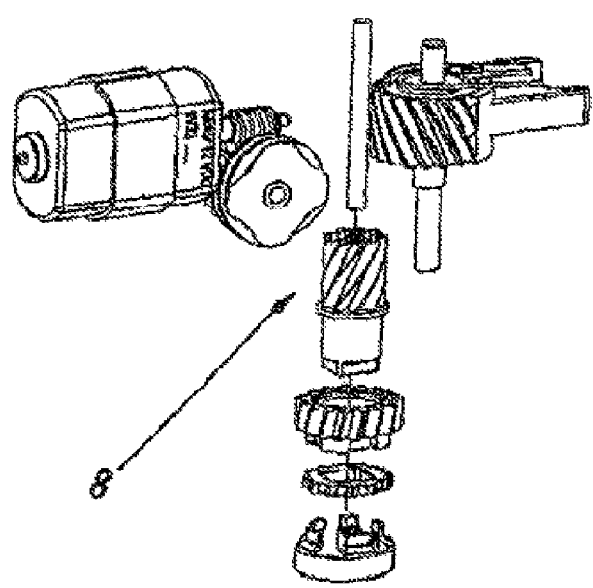
FIG. 14 is an exploded, perspective view of some components of the ejection device illustrated in FIG. 13.

FIG. 13 is a further exploded representation of the ejection device 8 illustrated in FIGS. 11a and 12, wherein all of the casing of the ejection device 8 can be seen. Furthermore, the arrangement of the potentiometer 15 directly on a plate 44, which houses all the circuits of the ejection device 8, can be seen in FIG. 13. The potentiometer 15 is connected to the gear mechanism 13 via the drive 22 and measures the position of the lever 4. FIG. 14 is a further exploded representation of the drive mechanism of the ejection device 8.

Figure 15C:
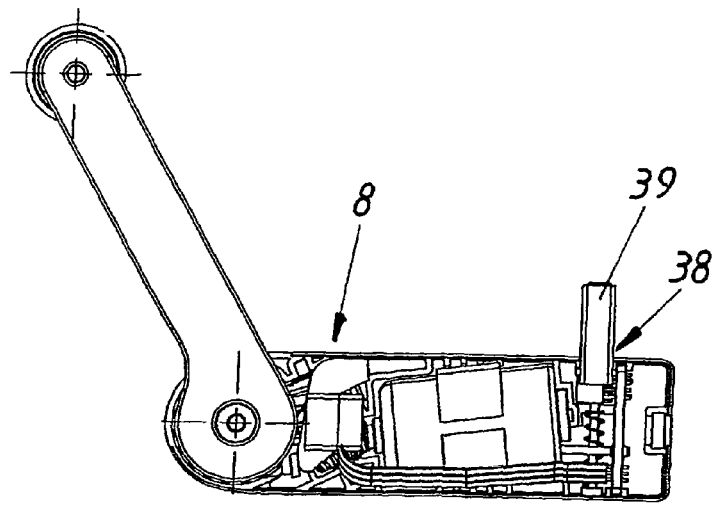
FIGS. 15a to 15c are cross-sections of a further embodiment of an ejection device according to the invention.
Figure 15B:
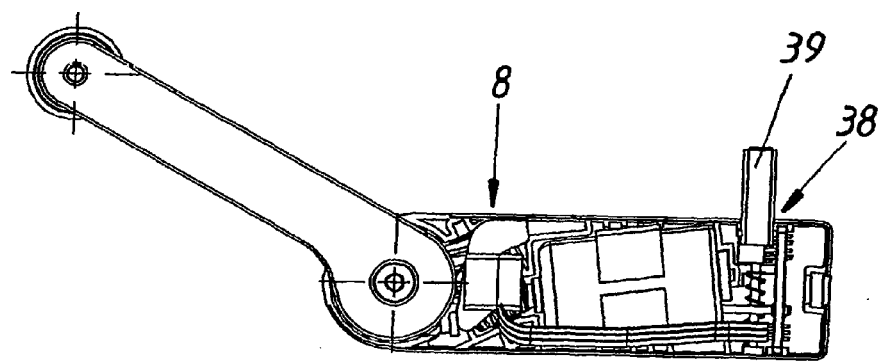
Figure 15A:
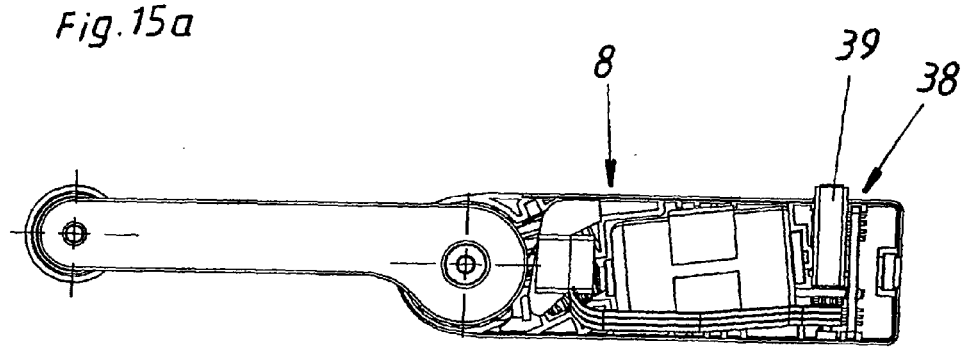
Figure 16:
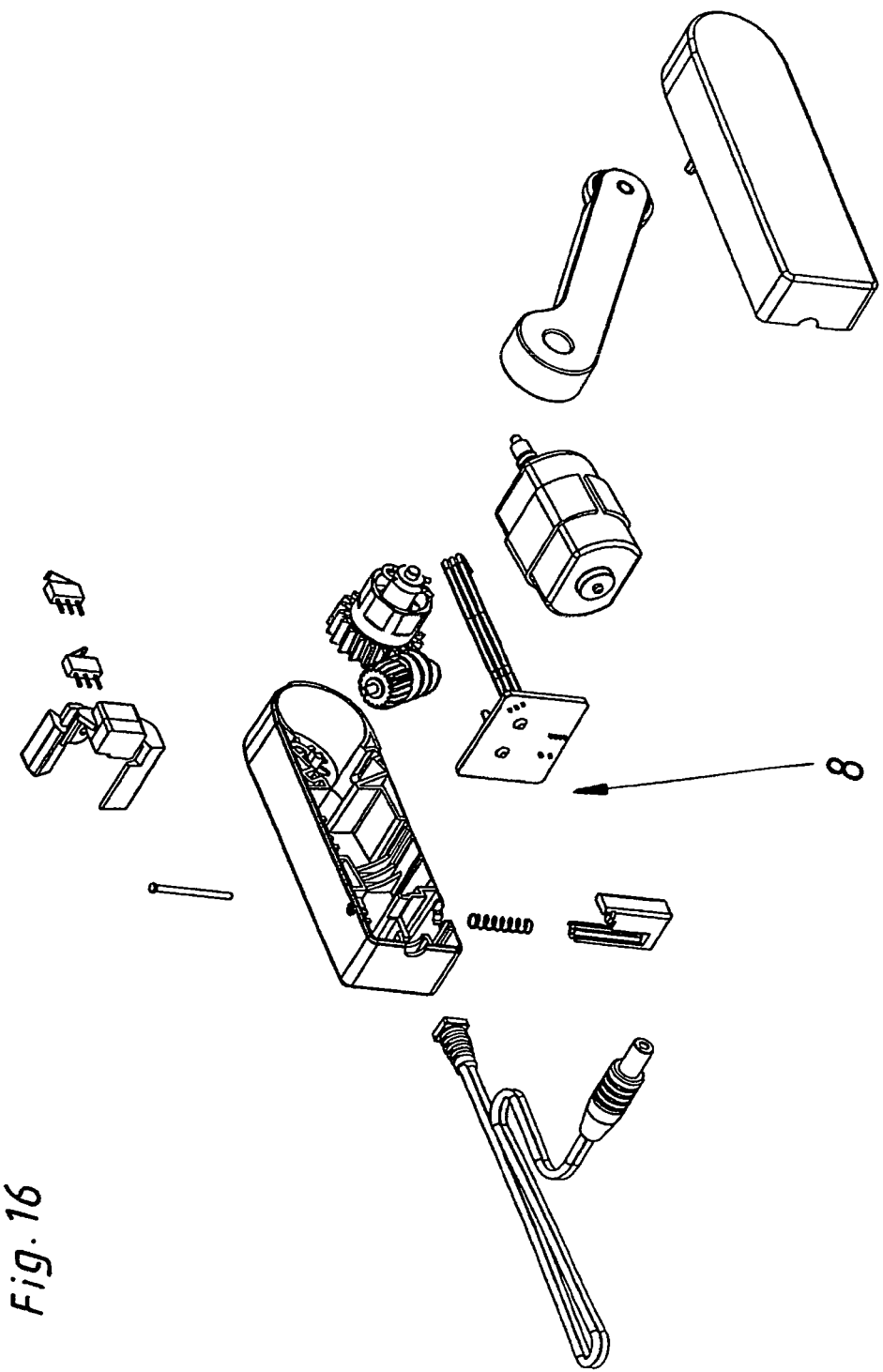
FIG. 16 is an exploded view of the ejection device illustrated in FIG. 15.

A further embodiment of an ejection device 8 according to the invention is illustrated in FIGS. 15a to 15c. This embodiment is characterized in particular by a path-measuring device 38. The path-measuring device 38 has a spring-loaded pusher 39 which can be subjected to pressure by a movable furniture component 2, not shown. In FIG. 15a, the pusher 39 has been pushed into the housing of the ejection device 8 by the movable furniture component 2, which triggers the ejection process. The structure of this ejection device is more clearly shown in FIG. 16, which is an exploded view.

Figure 17:
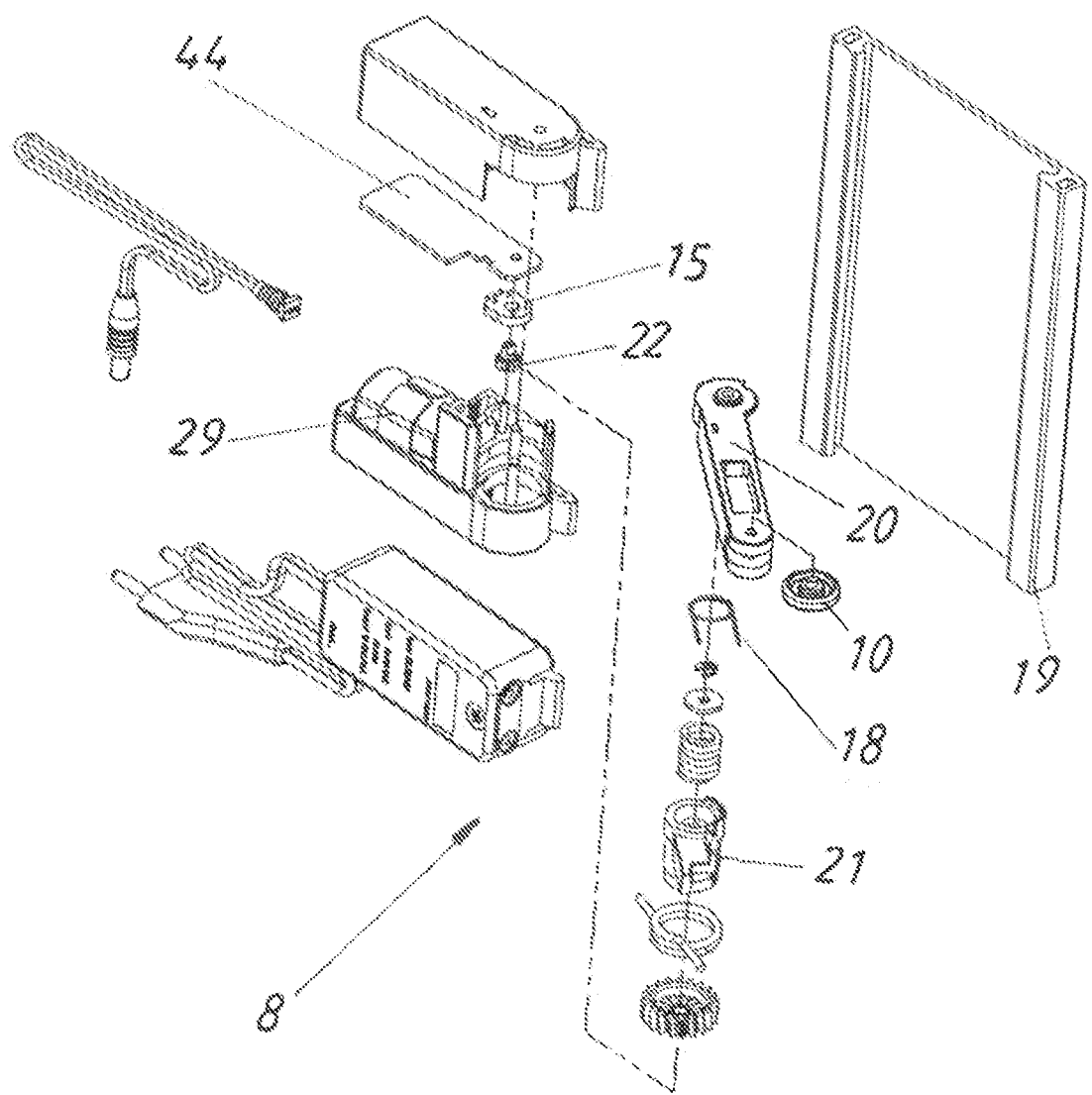
FIG. 17 is an exploded view of a further embodiment of an ejection device according to the invention.

FIG. 17 is an exploded view of a further embodiment of an ejection device 8 according to the invention, which differs from the embodiment illustrated in FIG. 13 only in that one fewer gear mechanism stage is provided.

An item of furniture 1 is shown in FIGS. 18a to 18d. The item of furniture includes a movable furniture component 2 formed as a drawer. A path-measuring device 38 attached to the furniture body 3 which comprises an encoder 45 can be seen. Force can be applied to a pusher 39 by the back of the movable furniture component 2. In the position illustrated in FIG. 18a, the pusher 39 is pushed in by the movable furniture component 2 which is in its closed position. When a user moves the movable furniture component 2 slightly out of its closed position, the spring-impacted pusher 39 moves outward, and the movement is recorded by the encoder 45. The path-measuring device 38 then issues to an ejection device 8, not illustrated in FIG. 18, a command to eject the movable furniture component 2.

Figure 19A:
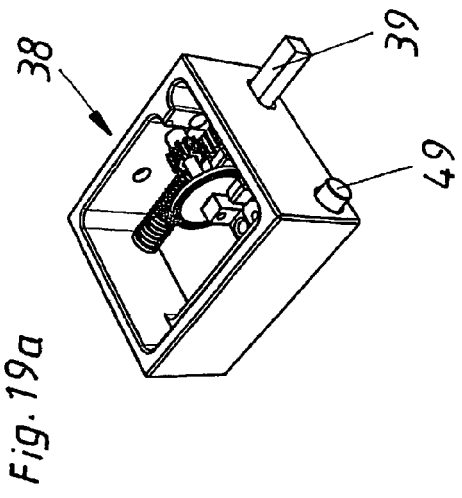
FIGS. 19a to 19c show an embodiment of a path-measuring device in two perspective views and in exploded view.
Figure 19B:
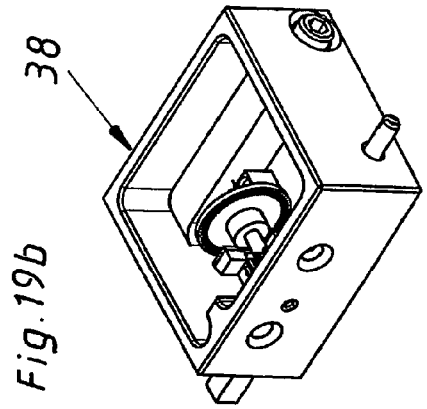
Figure 19C:
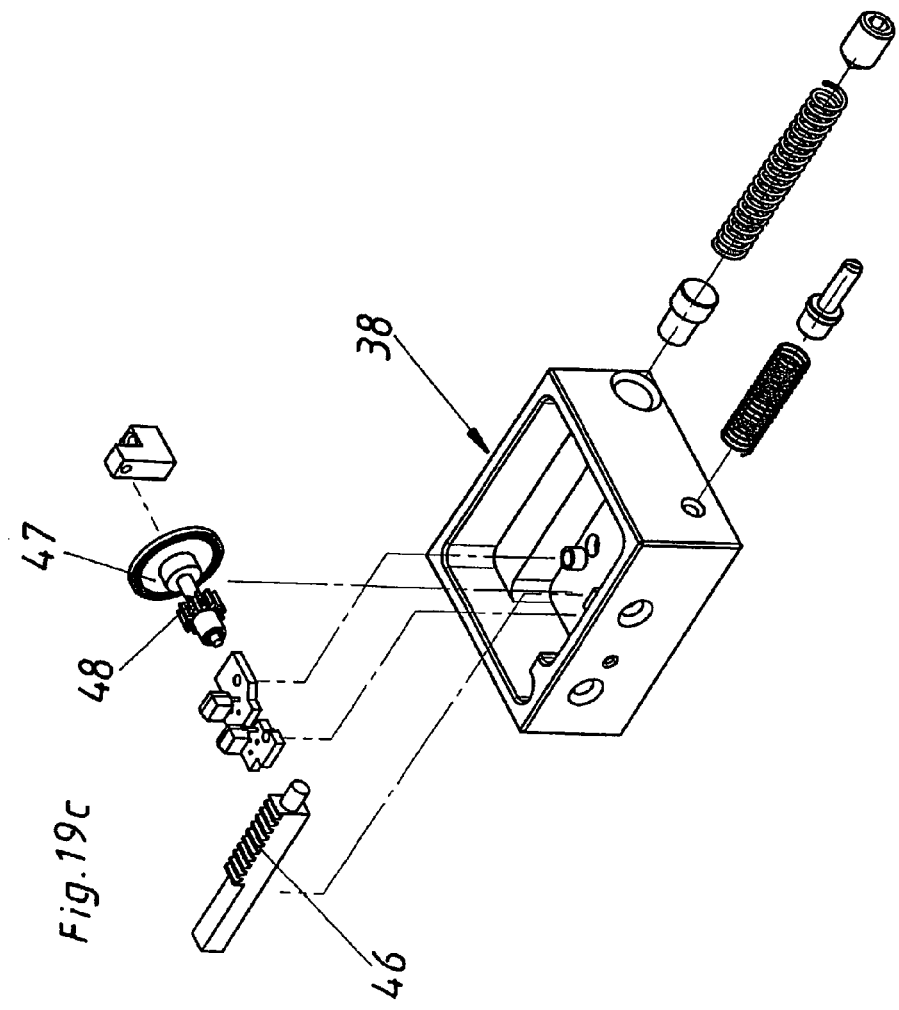

The path-measuring device 38 shown in FIGS. 18a-18d is shown in detail in FIGS. 19a to 19c. As shown, the pusher 39 is formed as a toothed rack 46, which engages a pinion 48 connected to the disk 47 of the encoder 45. A spring-loaded stop 49 which enables path measurement when the movable furniture component 2 is in its closed position, and pressed in the direction of the furniture body 3 by the user for actuation.

Figure 21A:
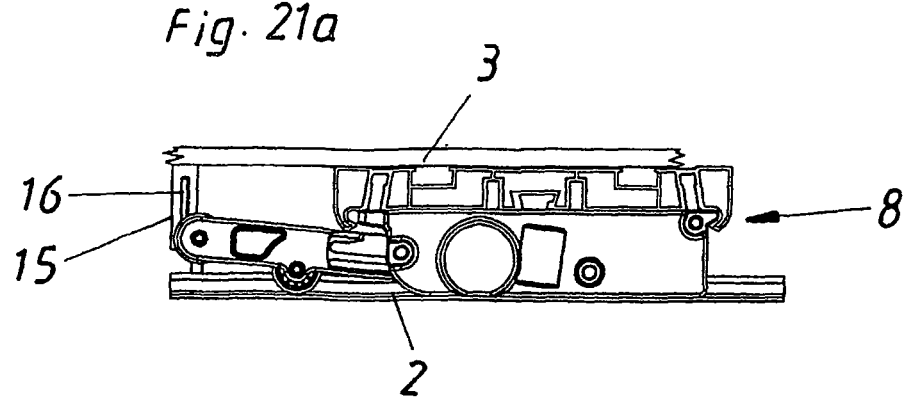
FIGS. 21a to 21c are top views of the ejection device illustrated in FIGS. 20a to 20c.
Figure 21B:
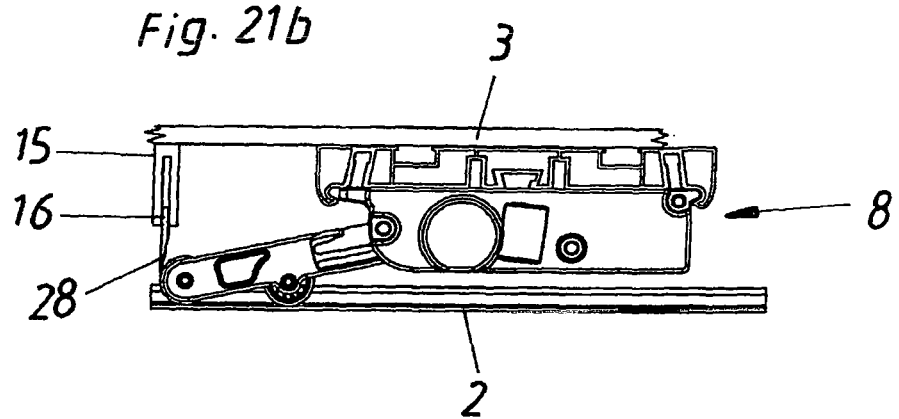
Figure 21C:
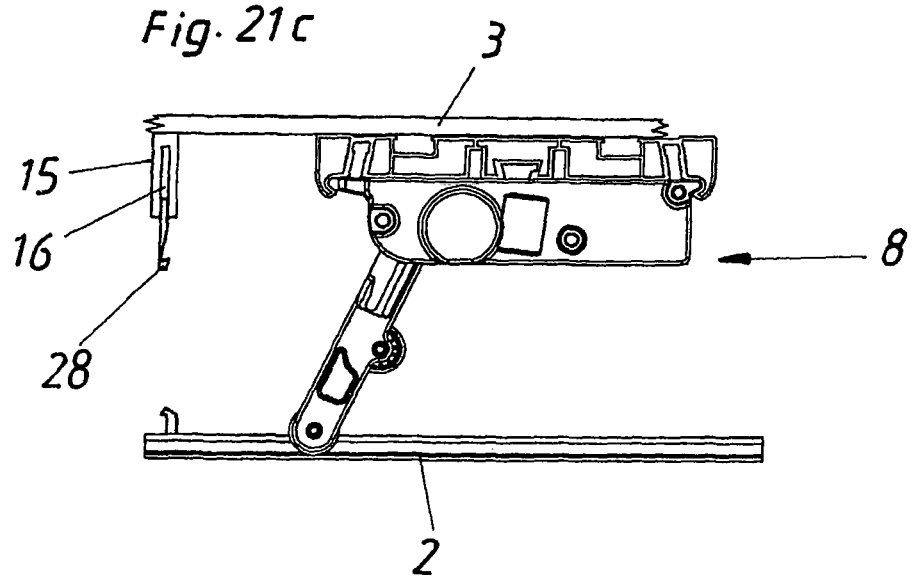

A further embodiment of an ejection device according to the invention 8 is illustrated in FIGS. 20a to 20c. This embodiment is characterized by a potentiometer 15 attached to the furniture body 3. The actuator 16 of the potentiometer 15 is connected to the back of a movable furniture component 2 via a drive carrier 28. The movement of the movable furniture component 2 out of its closed position drives the actuator 26 of the potentiometer 15 via the drive carriers 28, whereupon the potentiometer 15 orders the ejection of the movable furniture component 2 by the ejection device 8. This process is illustrated in FIGS. 21a to 21c in a top view.

The invention claimed is:

1. An ejection device for a movable furniture component disposed in or against a furniture body, the ejection device comprising:
   an electric motor;
   a lever having a free end for ejecting the movable furniture component;
   a gear mechanism for transmitting force from the electric motor to the lever; and
   a first castor disposed at the free end of the lever, the first castor rolling along the movable furniture component as the lever is displaced and being configured such that the lever pushes but cannot pull the movable furniture component;
   wherein the gear mechanism has a slipping clutch which includes a spring washer and driving dogs,
   wherein the spring washer extends upon overload and slips over the driving dogs.

2. An item of furniture comprising:
   a movable furniture component to be disposed in or against a furniture body; and
   an ejection device for ejecting the movable furniture component, the ejection device including:
   an electric motor;
   a lever having a free end for ejecting the movable furniture component;
   a gear mechanism for transmitting force from the electric motor to the lever, the gear mechanism having a slipping clutch including a spring washer and driving dogs, the spring washer extending upon overload and slipping over the driving dogs; and
   a first castor disposed at the free end of the lever, the first castor releasably contacting the movable furniture component,
   wherein the movable furniture component has a range of motion which includes an end position in which the ejection device does not contact the movable furniture component.

3. The item of furniture of claim 2, further comprising a path measuring device arranged on or in the item of furniture, wherein the path measuring device activates the ejection device.

4. The item of furniture of claim 3, wherein the path measuring device is arranged on or in the ejection device.

5. The item of furniture of claim 3, further comprising a furniture body,
   wherein the movable furniture component is movable with respect to the furniture body, and
   wherein the path measuring device is arranged on or in the furniture body.

6. The item of furniture of claim 3, wherein the path measuring device comprises an encoder.

7. The item of furniture of claim 3, wherein the path measuring device a potentiometer.

8. The item of furniture of claim 2, wherein the movable furniture component is a drawer or a door.

9. An ejection device for a movable furniture component disposed in or against a furniture body, the ejection device comprising:
- an electric motor;
- a lever having a free end for ejecting the movable furniture component;
- a gear mechanism for transmitting force from the electric motor to the lever; and
- a path measuring device which activates the ejection device,
- wherein the gear mechanism has a slipping clutch which includes a spring washer and driving dogs,
- wherein the spring washer radially expands upon overload and slips over the driving dogs,
- wherein the path measuring device is a potentiometer directly coupled to the lever, and
- wherein slipping of the slipping clutch does not change a position of the potentiometer relative to the lever.

10. The ejection device of claim 9, wherein the driving dogs are constituted by ridges on an outer periphery of a rotary member, and the spring washer is disposed radially outwardly of the outer periphery of the rotary member and engages the ridges to transmit force from the electric motor to the lever,
- wherein the spring washer radially expands upon overload and slips over the ridges.

11. An item of furniture comprising:
- a movable furniture component; and
- the ejection device of claim 9.

12. The item of furniture of claim 11, further comprising a furniture body,
- wherein the movable furniture component is movable with respect to the furniture body, and
- wherein the path measuring device is arranged on or in the furniture body.

13. The item of furniture of claim 11, wherein the path measuring device comprises an encoder.

14. The item of furniture of claim 11, wherein the movable furniture component is a drawer or a door.

15. The item of furniture of claim 11, further comprising a first castor disposed at the free end of the lever, the first castor releasably contacting the movable furniture component,
- wherein the movable furniture component has a range of motion which includes an end position in which the ejection device does not contact the movable furniture component.

16. The ejection device of claim 9, further comprising a first castor disposed at the free end of the lever, the first castor rolling along the movable furniture component as the lever is displaced and being configured such that the lever pushes but cannot pull the movable furniture component.

* * * * *